US010178361B2

(12) United States Patent
Itoh et al.

(10) Patent No.: US 10,178,361 B2
(45) Date of Patent: Jan. 8, 2019

(54) IMAGE PICKUP ELEMENT, IMAGING APPARATUS, AND IMAGE RECOGNITION SYSTEM USING NON-POLARIZED LIGHT

(71) Applicants: Izumi Itoh, Tokyo (JP); Masayuki Fujishima, Kanagawa (JP); Sukehiro Kimura, Kanagawa (JP); Hiroyoshi Sekiguchi, Kanagawa (JP); Yuji Takahashi, Kanagawa (JP)

(72) Inventors: Izumi Itoh, Tokyo (JP); Masayuki Fujishima, Kanagawa (JP); Sukehiro Kimura, Kanagawa (JP); Hiroyoshi Sekiguchi, Kanagawa (JP); Yuji Takahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/539,968

(22) PCT Filed: Dec. 9, 2015

(86) PCT No.: PCT/JP2015/006132
§ 371 (c)(1),
(2) Date: Jun. 26, 2017

(87) PCT Pub. No.: WO2016/103607
PCT Pub. Date: Jun. 30, 2016

(65) Prior Publication Data
US 2017/0374325 A1  Dec. 28, 2017

(30) Foreign Application Priority Data

Dec. 26, 2014  (JP) ................................. 2014-264726

(51) Int. Cl.
*G02B 5/20* (2006.01)
*G02B 5/30* (2006.01)
(Continued)

(52) U.S. Cl.
CPC ............. *H04N 9/07* (2013.01); *G02B 3/0056* (2013.01); *G02B 5/201* (2013.01); *G02B 5/30* (2013.01); *G06K 9/00771* (2013.01); *H04N 9/04* (2013.01)

(58) Field of Classification Search
CPC ........ G02B 3/0056; G02B 5/201; G02B 5/30; G06K 9/00771; H04N 9/07
See application file for complete search history.

(56) References Cited

U.S. PATENT DOCUMENTS

| 8,345,144 | B1 | 1/2013 | Georgiev et al. |
| 2004/0193647 | A1* | 9/2004 | Ueda ........................ H04N 7/163 |

(Continued)

FOREIGN PATENT DOCUMENTS

| EP | 2 034 743 A1 | 3/2009 |
| EP | 2040477 A1 | 3/2009 |

(Continued)

OTHER PUBLICATIONS

International Search Report dated Feb. 16, 2016 in PCT/JP2015/006132 filed on Dec. 9, 2015.

(Continued)

*Primary Examiner* — Amy R Hsu
(74) *Attorney, Agent, or Firm* — Oblon, McClelland, Maier & Neustadt, L.L.P.

(57) ABSTRACT

To achieve an image pickup element that can utilize polarized light as well as non-polarized light to image or capture an object, an image pickup element is provided to an imaging apparatus that forms an image of an object to be imaged onto a light-receiving surface of an image sensor, acquires a polarized filter image together with a regular luminance image, and executes image processing on the acquired images. The image pickup element includes, on a light-receiving surface LRS of the image sensor IMS, a (Continued)

polarizing filter PFL including at least two kinds of pixels having different transmission and polarization properties from each other.

12 Claims, 3 Drawing Sheets

(51) Int. Cl.
  *G06K 9/00* (2006.01)
  *H04N 9/04* (2006.01)
  *H04N 9/07* (2006.01)
  *G02B 3/00* (2006.01)

(56) References Cited

U.S. PATENT DOCUMENTS

| | | | |
|---|---|---|---|
| 2005/0034169 A1* | 2/2005 | Maeda | H04N 21/6131 |
| | | | 725/131 |
| 2009/0278954 A1 | 11/2009 | Kanamori et al. | |
| 2009/0290039 A1 | 11/2009 | Kanamori et al. | |
| 2010/0282945 A1 | 11/2010 | Yokogawa | |
| 2011/0080487 A1* | 4/2011 | Venkataraman | H04N 5/2253 |
| | | | 348/218.1 |
| 2012/0002018 A1* | 1/2012 | Hiramoto | G03B 35/08 |
| | | | 348/49 |
| 2012/0069181 A1 | 3/2012 | Xue et al. | |
| 2012/0268602 A1 | 10/2012 | Hirai et al. | |
| 2012/0287506 A1* | 11/2012 | Yao | G02B 5/201 |
| | | | 359/491.01 |
| 2013/0136306 A1 | 5/2013 | Li et al. | |
| 2013/0188023 A1* | 7/2013 | Kuang | H01L 27/14621 |
| | | | 348/49 |
| 2014/0253756 A1 | 9/2014 | Yokogawa | |

FOREIGN PATENT DOCUMENTS

| | | |
|---|---|---|
| JP | 2006-254331 | 9/2006 |
| JP | 2011-2718 | 1/2011 |
| JP | 2011-150686 | 8/2011 |
| JP | 2011-165005 | 8/2011 |
| JP | 2012-33149 | 2/2012 |
| JP | 2012-84121 | 4/2012 |
| JP | 2012-212978 | 11/2012 |
| JP | 2013-197670 | 9/2013 |
| JP | 2016-127312 | 7/2016 |

OTHER PUBLICATIONS

Extended Search Report dated Nov. 2, 2017 in European Patent Application No. 15872182.9.

* cited by examiner

[Fig. 1A]
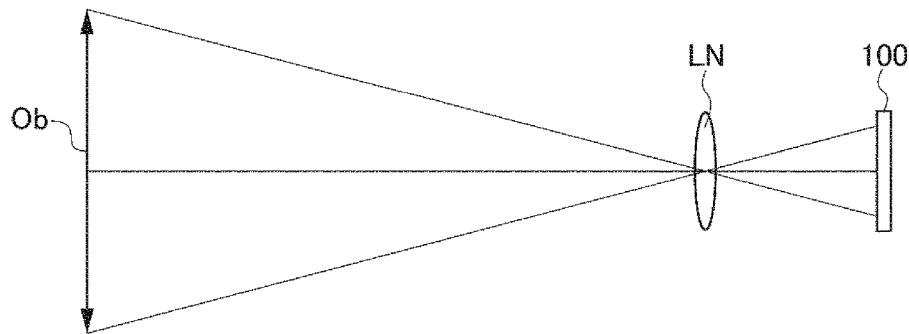
[Fig. 1B]
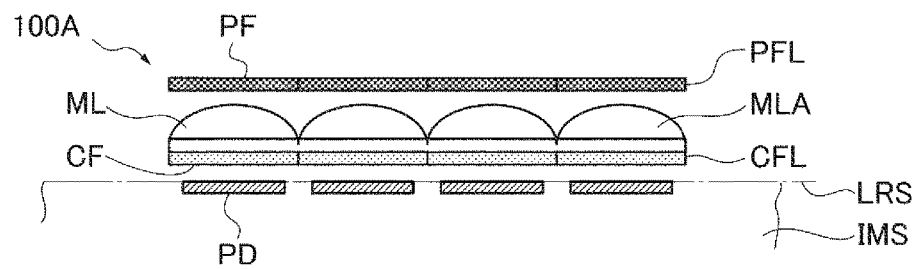
[Fig. 1C]
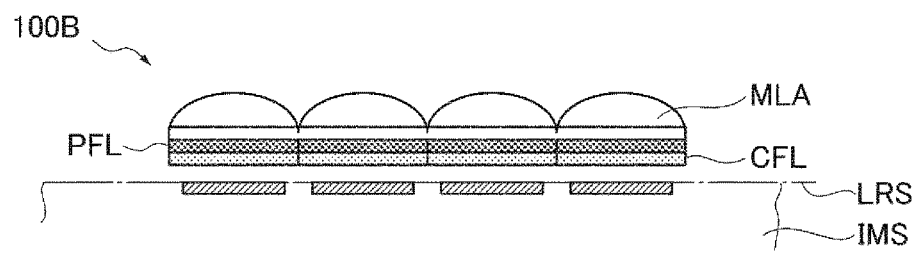
[Fig. 1D]
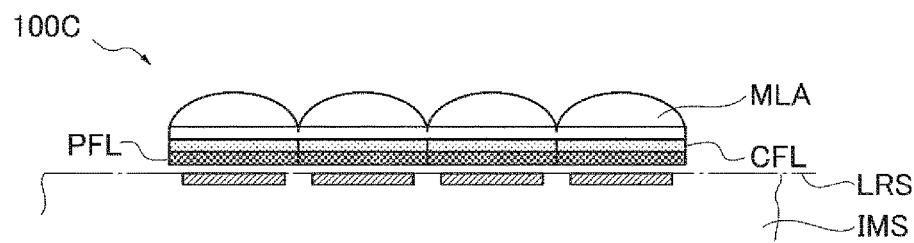

[Fig. 2]
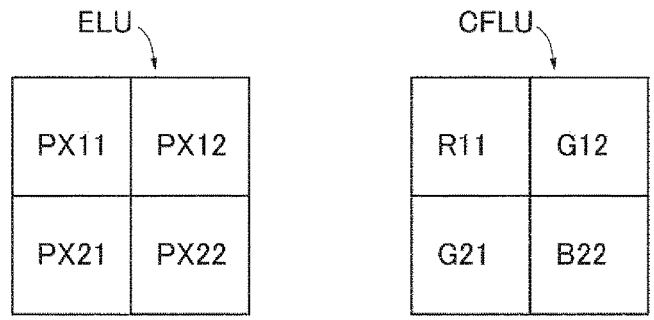
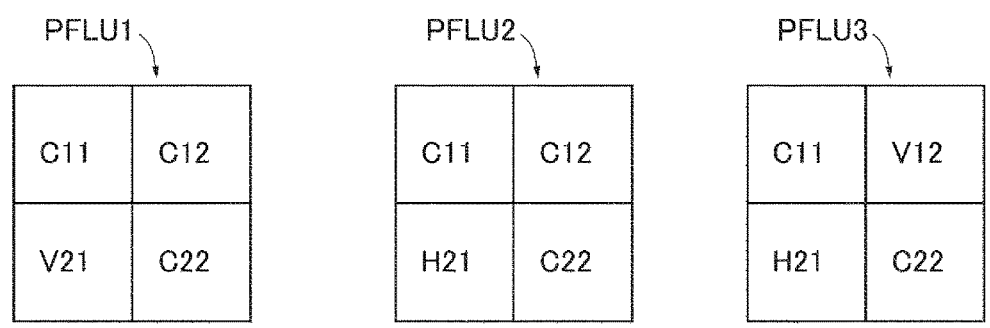
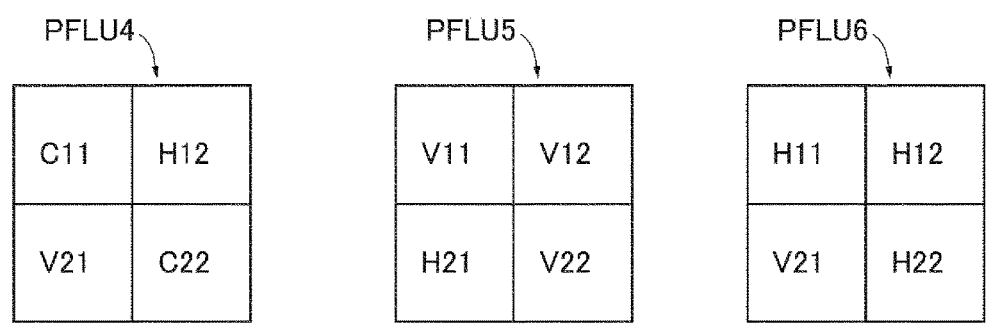

[Fig. 3]
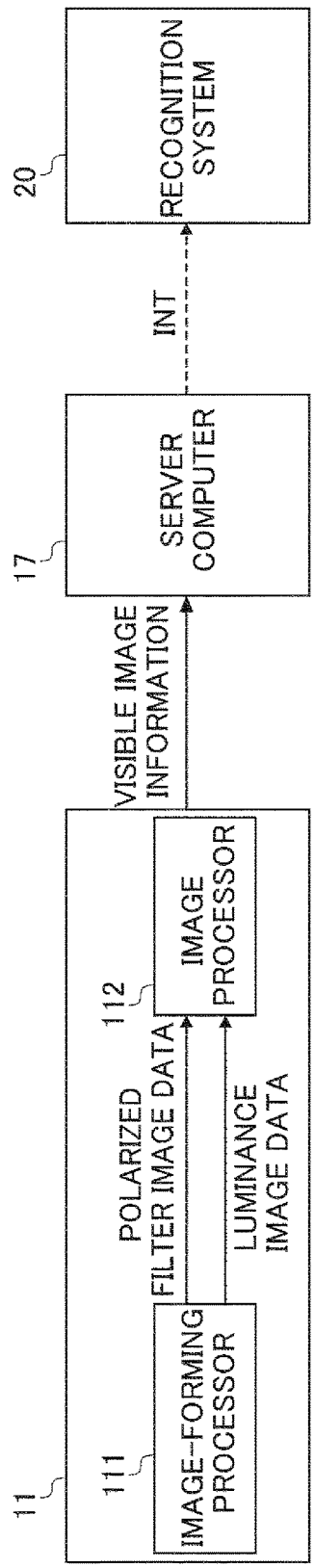

IMAGE PICKUP ELEMENT, IMAGING APPARATUS, AND IMAGE RECOGNITION SYSTEM USING NON-POLARIZED LIGHT

PRIORITY CLAIM

The present application is based on and claims priority to Japanese patent application No. 2014-264726, filed Dec. 26, 2014, the disclosure of which is hereby incorporated by reference herein in its entirety.

TECHNICAL FIELD

This invention is related to an image pickup element, an imaging apparatus, and an image recognition system.

BACKGROUND ART

An imaging apparatus to acquire an object image of an object to be imaged by imaging an image of the object onto a light-receiving surface of an image sensor has been known. Note, the "object to be imaged (also simply referred to as "object")" means an object that is to be imaged, and the "object image" means an image acquired or obtained by imaging or capturing the object. Here, a transparent plate may exist between the imaging apparatus and the object to be imaged. For instance, an object present inside a building may be imaged from outside of the building through a glass window. For another instance, a driver (object) inside a vehicle may be captured from the outside of the vehicle through a windscreen.

When an imaging apparatus images or captures an object through a transparent plate, reflection light reflected by the transparent plate may be included into the object image as a noise. As a result, the image quality of the object image may be deteriorated. In order to reduce the influence of the noise caused by the reflection light, a method of imaging an object using polarized light has been taught by, for example, Patent Literature 1.

SUMMARY OF INVENTION

Technical Problem

One of technical problems to be solved by the present invention is to achieve an image pickup element that can utilize polarized light as well as non-polarized light to image or capture an object.

Solution to Problem

An aspect of the present invention provides an image pickup element provided to an imaging apparatus. Here, the apparatus images an image of an object to be imaged onto a light-receiving surface of an image sensor, acquires a polarized filter image together with a regular luminance image, and executes image processing on the acquired images. The image pickup element includes, on the light-receiving surface of the image sensor, a polarizing filter that includes at least two kinds of pixels having different transmission and polarization properties from each other.

Advantageous Effects of Invention

The image pickup element of the present invention can acquire the polarized filter image together with the regular luminance image.

BRIEF DESCRIPTION OF DRAWINGS

FIG. 1A is a view for explaining an imaging apparatus.
FIG. 1B is a view for explaining a first example of an image pickup element.
FIG. 1C is a view for explaining a second example of the image pickup element.
FIG. 1D is a view for explaining a third example of the image pickup element.
FIG. 2 is a view for explaining a basic pixel matrix, a basic color-filter matrix, and a basic polarizing-filter matrix.
FIG. 3 is a view for explaining an embodiment of an image recognition system.

DESCRIPTION OF EMBODIMENT

FIG. 1A is an explanatory view for explaining an image processing of an imaging apparatus. In FIG. 1A, reference sign Ob denotes an object to be imaged (hereinafter, may simply be called an "object")", reference sign LN denotes an imaging forming lens system, and reference number 100 denotes an image pickup element. The imaging apparatus images an image of the object Ob on a light-receiving surface of the image pickup element 100 using the imaging forming lens system LN. Here, imaging apparatuses including imaging forming lenses and image pickup elements have conventionally been known. Hence, the configurations of the convention imaging apparatuses are applicable to the imaging apparatus of the present invention. The imaging forming lens is preferably an image-side telecentric lens such that the image-forming light enters into the light-receiving surface of the image pickup element 100 with a small incident angle.

FIGS. 1B to 1D show three examples of the configuration of the image pickup element according to the present invention. In FIGS. 1B to 1D, reference sign IMS denotes an image sensor, sign LRS indicates a light-receiving surface of the image sensor IMS, CFL indicates color filters, and MLA indicates micro lens arrays. The image sensor IMS includes a plurality of micro photoelectric conversion devices PD arranged two-dimensionally on the light-receiving surface LRS. Specifically, the photoelectric conversion devices PD are closely arranged in the left-and-right direction on the paper surface and in the orthogonal direction to the paper surface. The color filters CFL are configured by two-dimensionally arranging filters CF on the light-receiving surface LRS in the same manner as the photoelectric conversion devices PD. The filters CF are used to color-separate the light entering into the photoelectric conversion devices PD.

The micro lens arrays MLA are configured by two-dimensionally arranging a plurality of micro lenses ML in the same manner as the photoelectric conversion devices PD. Here, the micro lenses ML have a convex lens shape. Polarizing filters PFL are configured by two-dimensionally arranging a plurality of polarizing elements PF in the same manner as the photoelectric conversion devices PD. Here, the polarizing elements PF have light transmission properties. The image pickup element 100A illustrated in FIG. 1B determines positions of the polarizing filters PFL, color filters CFL, and micro lens arrays MLA such that the polarizing filters PFL sandwich the micro lens arrays MLA with the color filters CFL. The image pickup element 100B illustrated in FIG. 1C determines positions of the polarizing filters PFL, color filters CFL, and micro lens arrays MLA such that the polarizing filters PFS are sandwiched by the color filters CFL and micro lens arrays MLA. The image pickup element 100C illustrated in FIG. 1D determines positions of the polarizing filters PFL, color filters CFL, and micro lens arrays MLA such that the polarizing filters PFL sandwich the color filters CFL with the micro lens arrays MLA.

Note that the order of the polarizing filters PFL, color filters CFL, and micro lens arrays MLA of the image pickup element 100A illustrated in FIG. 1B, etc. is arbitrarily selected. For instance, both the polarizing filters PFL and the color filters CFL may be placed above or below the micro lens arrays MLA. Here, the ones close to the micro lens arrays MLA do not matter, i.e., the polarizing filters PFL may be closer to the micro lens arrays MLA or the color filters CFL may be closer to the micro lens arrays MLA. As described above, the two-dimensional arrangement of the filters CF of the color filters CFL, the two-dimensional arrangement of the micro lenses ML of the micro lens arrays MLA, and the two-dimensional arrangement of the polarizing elements PF of the polarizing filters PFL follow the two-dimensional arrangement of the photoelectric conversion devices PD.

That is, each of the photoelectric conversion devices PD corresponds to a set of a filter CF, a polarizing element PF, and a micro lens ML. When the incident light advancing to each photoelectric conversion device PD is condensed and guided to the photoelectric conversion device PD by the micro lens ML, the incident light passes through and receives actions of the polarizing element PF and the filter CF. Note that if an object image acquired by the imaging apparatus is a monochromatic image, the color filters CFL can be omitted.

In the following description, the object images acquired by the imaging apparatus are color images, and therefore, the imaging apparatus includes color filters CFL. As already described, each of the photoelectric conversion devices PD corresponds to the set of a filter CF, a polarizing element PF, and a micro lens ML.

A photoelectric conversion region of each photoelectric conversion device PD is called a pixel. Further, each of the filters CF and each of the polarizing elements PF respectively corresponding to each photoelectric conversion device PD is also called a pixel. A unique characteristic of the image pickup element of the present invention is the polarizing filter including, on the light-receiving surface LRS of the image sensor IMS, at least two kinds of pixels having different transmission and polarization properties from each other In FIG. 2, reference sign ELU denotes a basic pixel matrix. The basic pixel matrix ELU is a matrix having four pixels PX11 to PX22 arranged in a square shape. The four pixels PX11 to PX22 have the same shape. The light-receiving surface LRS of the image sensor IMS is formed by repeatedly arranging the basic pixel matrixes ELU in two directions orthogonal to each other (up-and-down direction and left-and-right direction of the paper surface of FIG. 2). In FIG. 2, reference sign CFLU denotes a basic color-filter matrix which is formed by arranging four filters R11, G12, G21, and B22. Each of the filters R11, G12, G21, and B22 is the color filters CF and represents a single pixel of the color filter.

As illustrated, the basic color-filter matrix CFLU is formed by arranging four filters R11, G12, G21, and B22 in the same manner as the arrangement of the four pixels PX11 to PX22 in the basic pixel matrix ELU. The color filters CFL are configured by repeatedly arranging the basic color-filter matrixes CFLU in two directions orthogonal to each other (up-and-down direction and left-and-right direction of the paper surface of FIG. 2). Each of the filters R11, G12, G21, and B22 has the same shape as and is the same size as the pixel PX11 and the like. Each basic color-filter matrix CFLU has a single red filter R11, a single blue filter B22, and two green filters G12 and G21. The four filters R11, G12, G21, and B22 are laminated over the corresponding four pixels PX11, PX12, PX21, and PX22 of the basic pixel matrix ELU respectively.

In FIG. 2, reference signs PFLU1 to PFLU6 denote six basic polarizing-filter matrixes that represent examples of the arrangements of the polarizing elements PF of the polarizing filters PFL. Each of the basic polarizing-filter matrixes PFLU1 to PFLU 6 illustrated in FIG. 2 has four pixels (polarizing elements PF) arranged in a square shape. Each pixel has the same shape as and is the same size as the pixel PX11 and the like. The polarizing filters PFL are configured by repeatedly arranging the basic polarizing-filter matrixes PFLU in two directions orthogonal to each other (up-and-down direction and left-and-right direction of the paper surface of FIG. 2). Using the basic polarizing-filter matrixes PFLU1 as an example, the four polarizing elements C11, C12, V21, and C22 are laminated over the corresponding four pixels PX11, PX12, PX21, and PX22 of the basic pixel matrix ELU respectively.

Three of the polarizing elements C11, C12, and C22 among the four polarizing elements of the basic polarizing-filter matrix PFLU1 are filters that transmit light without polarization, and the polarizing element V21 is a filter that transmits the polarized component in the vertical direction (i.e., the component the electric field of which is vibrated in the vertical direction). That is, the polarizing elements C11, C12, and C13 do not polarize the transmitting light, and thus, is so-called transparent elements. However, in this specification, these elements are also referred as "polarizing elements" as these elements have transmission and polarization properties that allow the light to pass through without polarization.

As described above, the polarizing filters PFL having the basic polarizing-filter matrix PFLU1 arranged two-dimensionally include two kinds of pixels (the pixels C11, C12, and C22, and the pixel V21) having different transmission and polarization properties from each other. When the basic polarizing-filter matrix PFLU1 is used, the pixel PX21 of the basic pixel matrix ELU receives, on the light-receiving surface LRS thereof, light that has been color-separated in green by the filter G21 and been polarized in the vertical direction by the filter V21. Further, the remaining three pixels PX11, PX 12, and PX22 receive light that has been color-separated by the corresponding filters R11, G12, and B22 respectively without being polarized. As a result, light-receiving signals generated by the pixels PX11, PX12, and PX22 of the basic pixel matrixes ELU for the entire light-receiving surface LRS compose data of a regular color illuminance image. On the other hand, the light-receiving signals generated by the pixels PX21 of the basic pixel matrixes ELU for the entire light-receiving surface LRS compose data of a V-polarized image polarized by the polarizing filters PFL.

The color illuminance image is generated based on the three colors components, i.e., red (R), green (G), and blue (B) components. The polarized filter image is generated based on the components transmitted through the polarizing elements (pixels). Here, the polarizing elements (pixels) allow the electric-field components vibrating in the vertical direction and/or in the horizontal direction to transmit therethrough. Based on the light-receiving signals generated by the pixels PX12 and PX21, the polarized filter image can be acquired.

Here, it is possible to directly use the light-receiving signals generated by the pixel PX21. However, the difference between the outputs from the pixel PX12 and the pixel PX21, i.e., (Outputs from PX12)−(Outputs from PX21)=ΔG, represents the luminance of the H-polarized component (polarized component where the electric field is vibrating in the horizontal direction) of the color-separated light in green. Accordingly, by using the difference ΔG and the outputs from the pixel PX21 (i.e., the luminance of the V-polarized component), it is possible to acquire the polarized filter image formed of the V-polarized component and the H-polarized component. As a result, it can acquire the both regular luminance image and polarized filter image by imaging the image of the object Ob onto the light-receiving surface LRS of the image sensor IMS.

The basic polarizing-filter matrix PFLU2 illustrated in FIG. 2 has a similar configuration to the matrix PFLU1, but includes a polarizing element H21 instead of the polarizing element V21 for the pixel PX21. The polarizing element H21 allows the polarized component in the horizontal direction to transmit therethrough. Similar to the basic polarizing-filter matrix PFLU1, the basic polarizing-filter matrix PFLU2 can acquire a regular color luminance image based on the outputs from the pixels PX11, PX12, and PX22. Further, the basic polarizing-filter matrix PFLU2 can acquire a polarized filter image based on the light-receiving signals from the pixels PX12 and PX21.

Here, the luminance of the V-polarized component of the color-separated light in green is calculated as: δG=(Outputs from PX12)−(Outputs from PX21).

Based on the luminance δG and the outputs from PX21 (i.e., luminance in the H-polarized component), it becomes possible to acquire a polarized filter image formed of the V-polarized component and the H-polarized component.

The basic polarizing-filter matrix PFLU3 illustrated in FIG. 2 has a similar configuration to the matrix PFLU2, but includes a polarizing element V12 instead of the polarizing element C12 for the pixel PX12. The polarizing element V12 allows the polarized component in the vertical direction to transmit therethrough. The basic polarizing-filter matrix PFLU3 can acquire a regular color luminance image based on the outputs from the pixels PX11, PX12, PX21, and PX22. To be specific, a regular luminance component in the green light component is calculated as a sum of the outputs of the pixel PX12 and of the pixels PX21, i.e.: ΣG=(Outputs from the pixel PX12)+(Outputs from the pixel PX21). As a result, it can acquire the regular color luminance image based on the outputs from the pixels PX11, PX22, and the sum ΣG.

Further, the basic polarizing-filter matrix PFLU3 can acquire a polarized filter image based on the outputs from the pixels PX12 and PX21. The basic polarizing-filter matrix PFLU4 illustrated in FIG. 2 has a similar configuration to the matrix PFLU3, but includes polarizing elements H12 and V21 instead of the polarizing elements V12 and H21 for the pixels PX12 and PX21. Similar to the basic polarizing-filter matrix PFLU3, the basic polarizing-filter matrix PFLU4 can acquire a regular color luminance image based on the outputs from the pixels PX11, PX12, PX21, and PX22.

To be specific, a regular luminance component in the green light component is calculated as a sum of the outputs of the pixel PX12 and of the pixels PX21, i.e.: σG=(Outputs from the pixel PX12)+(Outputs from the pixel PX21).

As a result, it can acquire the regular color luminance image based on the outputs from the pixels PX11, PX22, and the sum σG. The polarized filter image is then acquired based on the outputs from the pixels PX12 and PX21.

The basic polarizing-filter matrix PFLU5 illustrated in FIG. 2 has a similar configuration to the matrix PFLU3, but includes polarizing elements V11 and V22 instead of the polarizing elements C11 and C22 for the pixels PX11 and PX22. The basic polarizing-filter matrix PFLU6 illustrated in FIG. 2 has a similar configuration to the matrix PFLU5, but includes polarizing elements H11, H12, and H22 instead of the polarizing elements V11, V12, and V22 for the pixels PX11, PX12, and PX22, and further includes a polarizing element V21 instead of the polarizing element H21. Similar to the other basic polarizing-filter matrixes, the basic polarizing-filter matrix PFLU5 and the basic polarizing-filter matrix PFLU6 can acquire a color luminance image based on the outputs from the pixels PX11, PX12, and PX22. Although the outputs from these three pixels are all polarized components, it is possible to acquire the color luminance image based on the outputs since the polarization directions of these three pixels are identical to each other. Further, the basic polarized-filter matrixes PFLU5 and PFLU6 can also acquire a polarized filter image based on the outputs from the pixels PX11, PX12, PX21, and PX22.

When using the basic polarizing-filter matrix PFLU5 or PFLU6, it can equalize or uniform the luminance components of the entire image, resulting in improving the dynamic range advantageously. Although it depends on the object to be imaged Ob, generally, the pixels PX12 and PX21 receiving the green light components have higher luminance values than the pixels PX11 and PX22 receiving the red or blue light components. That is, depending on the imaging condition, the pixels PX12 and PX21 may be saturated. Compared to the case where two of the polarizing elements V12, V21, H12, and H21 are used for the pixel PX12 and PX21; the luminance value is about twice as high as the case where the polarizing elements C12 and C21 are used for the pixel PX12 and PX21. Therefore, when using the basic polarizing-filter matrix PFLU1, the luminance value of the pixel PX12 becomes higher than those of the other pixels. In contrary, when using the basic polarizing-filter matrix PFLU5 or PFLU6, the luminance values of the all four pixels represent the luminance values of the polarized components. Namely, it can equalize or uniform the luminance values among the single matrix.

In general, the pixels having non-transparent elements have lower luminance values than the other pixels do. Namely, in the basic polarizing-filter matrix PFLU1 or PFLU2, the pixel PX21 which is used to acquire a polarized filter image has a lower luminance value than the other pixels PX11, PX12, and PX22 do. Hence, several light components of the pixels PX11, PX12, and PX22 having higher luminance values are mixed to the pixel PX21, i.e., causing a crosstalk. As a result, the pixel PX21 includes more error components (noises) disadvantageously.

This phenomenon is notable especially when the polarizing filters PFL are disposed away from the light-receiving surface LRS, as illustrated in FIG. 1B. In order to restrain the phenomenon, it is beneficial to reduce the luminance values of the pixels PX11, PX12, and PX22 by installing non-transparent elements, i.e., the polarizing elements V11, V12, and V22, or H11, H12, and H22 thereto (e.g., the basic polarizing filter matrixes PFLU5 and PFLU6). Note when outputting the color luminance images or polarized-filter images, it is necessary to execute additional processing, such as complementing processing using adjacent matrixes of the basic pixel matrixes ELU.

As clearly shown by the basic polarizing filter matrixes PFLU1 to PFLU6, the image pickup element of this embodiment includes polarizing filters PFL that includes, on the light-receiving surface LRS of the image sensor IMS, at least two kinds of pixels having different transmission and polarization properties from each other. Namely, when using the basic polarizing filter matrix PFLU1 or PFLU2, the polarizing filter includes two kinds of pixels, i.e., the transparent elements C11, C12, and C22, and the polarizing elements V21 or H21 that transmits the polarized component in the vertical direction or in the horizontal direction. When using the basic polarizing filter matrix PFLU5, the polarizing filter includes two kinds of pixels, i.e., the polarizing elements V11, V12, and V22 that transmits the polarized component in the vertical direction, and the polarizing element H21 that transmits the polarized component in the horizontal direction. Similarly, when using the basic polarizing filter matrix PFLU6, the polarizing filter includes two kinds of pixels, i.e., the polarizing elements H11, H12, and H22 that transmits the polarized component in the horizontal direction, and the polarizing elements V21 that transmits the polarized component in the vertical direction. When using the basic polarizing filter matrix PFLU3 or PFLU4, the polarizing filter includes three kinds of pixels, i.e., the transparent elements C11 and C12, the polarizing elements V12 for the polarized component in the vertical direction, and the polarizing element H21 for the polarized component in the horizontal direction; or the transparent elements C11 and C12, the polarizing elements H12 for the polarized component in the horizontal direction, and the polarizing elements V21 for the polarized component in the vertical direction. Note that these are only examples, and the pixels (polarizing elements) including at least two kinds of pixels having different transmission and polarization properties from each other should not be limited thereto.

Next, an embodiment of the imaging apparatus including the image pickup element of the present invention and an embodiment of an image recognition system using the imaging apparatus will be exemplarily described with reference to FIG. 3. The image recognition system is applicable to, for instance, an automatic toll collection system of a tollgate of a toll road. In FIG. 3, reference number 11 denotes the imaging apparatus configuring a polarization camera and including an image-forming processor 111 and an image processor 112.

As described with reference to FIG. 1A, the image-forming processor 111 includes an imaging forming lens system and image pickup sensors, and the image pickup sensors are configured as described above. As a result, the image-forming processor 111 outputs polarized filter image data and luminance image data. Here, the polarized filter image data are used to form the aforementioned polarized filter image, and the luminance image data are used to form the aforementioned color luminance image.

That is, the image-forming processor 111 of the polarization camera 11 outputs two kinds of image data (polarized filter image data and luminance image data). These two image data are processed by the image processor 112 to be visible image information of a color luminance image, and the processed information is input to a server computer 17. Together with the polarization camera 11, the server computer 17 forms a main part of an imaging system.

The server computer 17 encodes the input visible image information into a general-purpose image formats such as JPG and BMP, and transmits the encoded images to a recognition system 20 via an electronic communication line INT. The image transmitted to the recognition system 20 from the server computer 17 is used as an object to be recognized by the recognition system 20.

In this example illustrated in FIG. 3, the objects to be recognized are a vehicle passing through the automatic toll collection system and the driver thereof.

The recognition system 20 recognizes the vehicle and the driver thereof based on the transmitted information (image). When the polarization camera 11 images or captures the vehicle, a windscreen is interposed between the driver and the polarization camera 11. The reflection light reflected by the windscreen acts as a noise in the captured image. Accordingly, the object image is deteriorated by the noise, and therefore, it makes difficult to recognize and determine the driver. However, as described above, the visible image information is acquired by the polarization camera 11 by processing the color illumination image and the polarized filter image acquired separately.

As is known, polarizing filter can reduce reflected light. Therefore, the noises caused by the reflected light have been appropriately reduced in the polarized filter image data by the image-forming processor 111.

Therefore, the visible image information includes only a few noises caused by the reflected light such that it makes easy to recognize and determine the driver.

Note that a conventional method for recognizing and determining the driver is applicable to the present invention. For instance, the image recognition system may be configured to display the visible image information on a display screen as a visible image such that the user can determine the driver through visual inspection. Or, the image recognition system may be configured to collate the visible image information with data stored in the recognition system so as to automatically execute the recognition and determining processing. Further, the image recognition system may be configured to use the determination through both the visual inspection and the automatic determination, thereby improving the accuracy of the determination. As already described in above, the embodiment of the present invention can provide the following image pickup element, the image-forming apparatus, and the image recognition system.

(1) An image pickup element provided to an imaging apparatus, the imaging apparatus configured to image an image of an object to be imaged onto a light-receiving surface of an image sensor, to acquire a polarized filter image together with a regular luminance image, and to execute image processing on the acquired image. The image pickup element 100 includes, on the light-receiving surface LRS of the image sensor IMS, a polarizing filter PFL that includes at least two kinds of pixels having different transmission and polarization properties from each other.

(2) In the image pickup element according to (1), at least two kinds of pixels of the polarizing filter PFL include a non-polarizing pixel (transparent elements C11, and the like) that transmits all polarized components.

(3) In the image pickup element according to (1) or (2), at least two kinds of pixels of the polarizing filter PFL includes at least one polarizing pixel (polarizing elements V11, H21), and the like) that transmits a predetermined polarized component.

(4) The image pickup element according to any one of (1) to (3), further includes a color filter CFL that includes color pixels (filter CF) having the same pixels as and being arranged in the same manner as the polarizing filter PFL. The color filter CFL color-separates the image of the object to be imaged.

(5) In the image pickup element according to (4), the color filter CFL includes three color pixels composed of a red filter R11, a green filter G12, G21, and a blue filter B22.

(6) The imaging apparatus 11 includes the image pickup element according to any one of (1) to (5).

(7) An image recognition system includes an imaging system (11, 17) and a recognition system 20. The recognition system 20 includes the imaging apparatus 11 according to (6). The recognition system 20 is configured to execute processing for determining the object to be imaged based on an object image acquired by the imaging apparatus.

Although the present invention has been described in terms of exemplary embodiments, it is not limited thereto. It should be appreciated that variations or modifications may be made in the embodiments described by persons skilled in the art without departing from the scope of the present invention as defined by the following claims.

REFERENCE SIGNS LIST

CF Filter (Pixel of a color filter CFL)
CFL Color filter
IMS Image sensor
LN Imaging forming lens system
LRS Light-receiving surface
MLA Micro lens array
Ob Object to be imaged
PD Photoelectric conversion device
PF Polarizing element (pixel of a polarizing filter PFL)
PFL Polarizing filter
11 Polarizing camera (Imaging apparatus)
100 Image pickup element

CITATION LIST

Patent Literature

PTL 1: JP2011-002718 A

The invention claimed is:

1. An image pickup element provided to an imaging apparatus, the image pickup element comprising:
   an image sensor including a light-receiving surface, the imaging apparatus configured to image an image of an object to be imaged onto the light-receiving surface of the image sensor, to acquire a polarized filter image together with a regular luminance image, and to execute image processing on the acquired image;
   on the light-receiving surface of the image sensor, a polarizing-filter matrix that includes at least two kinds of pixels including a non-polarizing pixel that transmits all polarized components and a polarizing pixel that transmits a predetermined polarized component; and
   a color-filter matrix that includes color pixels having the same pixels as and being arranged in the same manner as the polarizing-filter matrix,
   wherein each of the pixels of the polarizing-filter matrix is aligned with a corresponding one of the color pixels of the color-filter matrix.

2. The image pickup element according to claim 1, wherein
   the color filter color-separates the image of the object to be imaged.

3. The image pickup element according to claim 2, wherein the color filter includes three color pixels composed of a red filter, a green filter, and a blue filter.

4. The image pickup element according to claim 1, wherein the light-receiving surface includes a basic pixel matrix including pixels generating light-receiving signal, each of the pixels of the polarizing-filter matrix being aligned with a corresponding one of the pixels of the basic pixel matrix.

5. The image pickup element according to claim 1, wherein the polarizing pixel is a vertical polarizing pixel configured to transmit only polarized component in a vertical direction, the vertical polarizing pixel being less than the non-polarizing pixel.

6. The image pickup element according to claim 1, wherein the polarizing pixel is a horizontal polarizing pixel configured to transmit only polarized component in a horizontal direction, the horizontal polarizing pixel being less than the non-polarizing pixel.

7. The image pickup element according to claim 1, wherein the polarizing-filter matrix includes three kinds of pixels including the non-polarizing pixel and two polarizing pixels, the two polarizing pixels including a horizontal polarizing pixel configured to transmit only polarized component in a horizontal direction and a vertical polarizing pixel configured to transmit only polarized component in a vertical direction.

8. The image pickup element according to claim 1, wherein the polarizing-filter matrix includes two polarizing pixels, the two polarizing pixels including at least a horizontal polarizing pixel configured to transmit only polarized component in a horizontal direction and a vertical polarizing pixel configured to transmit only polarized component in a vertical direction, the vertical polarization pixel being less than the horizontal polarization pixel.

9. The image pickup element according to claim 1, wherein the polarizing-filter matrix includes two polarizing pixels, the two polarizing pixels including at least a vertical polarizing pixel configured to transmit only polarized component in a vertical direction and a horizontal polarizing pixel configured to transmit only polarized component in a horizontal direction, the horizontal polarization pixel being smaller than the vertical polarization pixel.

10. An imaging apparatus configured to image an image of an object to be imaged onto a light-receiving surface of an image sensor, to acquire a polarized filter image together with a regular luminance image, and to execute image processing on the acquired image, the imaging apparatus comprising:
    an image pickup element
    comprising, on the light-receiving surface of the image sensor, a polarizing: filter matrix that includes at least two kinds of pixels including a non-polarizing pixel that transmits all polarized components and a polarizing pixel that transmits a predetermined polarized component,
    a color-filter matrix that includes color pixels having the same pixels as and being arranged in the same manner as the polarizing filter-filter matrix,
    wherein each of the pixels of the polarizing-filter matrix is aligned with a corresponding one of the color pixels of the color-filter matrix.

11. An image recognition system comprising:
    an imaging system and a recognition system, wherein
    the recognition system includes the imaging apparatus according to claim 10, and
    the recognition system is configured to execute processing for determining the object to be imaged based on an object image acquired by the imaging apparatus.

12. The image apparatus according to claim 10, wherein the light-receiving surface includes a basic pixel matrix including pixels generating light-receiving signal, each of the pixels of the polarizing-filter matrix being aligned with a corresponding one of the pixels of the basic pixel matrix.

* * * * *